United States Patent
Kim et al.

(10) Patent No.: US 9,508,378 B2
(45) Date of Patent: Nov. 29, 2016

(54) OPTICAL DISK AND OPTICAL DISK REPRODUCTION DEVICE FOR REPRODUCING SAME

(71) Applicant: SAMSUNG ELECTRONICS CO., LTD., Suwon-si (KR)

(72) Inventors: Jae-hyun Kim, Suwon-si (KR); Joji Anzai, Suwon-si (KR); Shuichi Tasaka, Seongnam-si (KR); Sang-yeal Park, Hwaseong-si (KR); Chang-hoon Son, Yongin-si (KR); Yukihiro Yamasaki, Suwon-si (KR); Jang-ho Jin, Hwaseong-si (KR); Byoung-ho Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/441,355

(22) PCT Filed: Nov. 7, 2013

(86) PCT No.: PCT/KR2013/010052
§ 371 (c)(1),
(2) Date: May 7, 2015

(87) PCT Pub. No.: WO2014/073872
PCT Pub. Date: May 15, 2014

(65) Prior Publication Data
US 2015/0287431 A1    Oct. 8, 2015

Related U.S. Application Data

(60) Provisional application No. 61/815,408, filed on Apr. 24, 2013, provisional application No. 61/723,497, filed on Nov. 7, 2012.

(30) Foreign Application Priority Data

Nov. 6, 2013   (KR) ........................ 10-2013-0133995

(51) Int. Cl.
  *G11B 7/00*   (2006.01)
  *G11B 7/007*  (2006.01)
(Continued)

(52) U.S. Cl.
  CPC ......... *G11B 7/0079* (2013.01); *G11B 7/00736* (2013.01); *G11B 7/08511* (2013.01); *G11B 7/24038* (2013.01)

(58) Field of Classification Search
  CPC ............ G11B 7/0079; G11B 7/08511; G11B 7/00736; G11B 7/24038; G11B 20/1217; G11B 20/1262; G11B 20/24041; G11B 19/128; G11B 2220/2541; G11B 2020/1279
  USPC ..................... 369/275.3, 47.15, 47.27, 53.22
  See application file for complete search history.

(56) References Cited

U.S. PATENT DOCUMENTS 5,756,265 A   5/1998 Abe et al.
6,320,825 B1  11/2001 Bruekers et al.
(Continued)

FOREIGN PATENT DOCUMENTS

CN   1145516 A       3/1997
JP   2001-510619 A   7/2001
(Continued)

OTHER PUBLICATIONS

Search Report dated Mar. 20, 2014, issued by the International Searching Authority in counterpart International Application No. PCT/KR2013/010052.

(Continued)

*Primary Examiner* — Ali Neyzari
(74) *Attorney, Agent, or Firm* — Sughrue Mion, PLLC

(57) ABSTRACT

An optical disk and an optical disk reproduction device for reproducing the same are provided. The optical disk including at least one layer comprises an information storage area for storing information on the optical disk and a data area for storing data, wherein the information storage area stores information on the amount of reflection and thickness of each of a plurality of layers, and transmission speed information on a plurality of areas which constitute the data area.

14 Claims, 8 Drawing Sheets

(51) Int. Cl.
*G11B 7/085* (2006.01)
*G11B 7/24038* (2013.01)

(56) References Cited

U.S. PATENT DOCUMENTS

| | | | |
|---|---|---|---|
| 6,381,208 B1 | 4/2002 | Abe et al. | |
| 8,325,576 B2 * | 12/2012 | Nishimura | G11B 7/00736 369/47.27 |
| 2003/0063530 A1 | 4/2003 | Takehara et al. | |
| 2004/0085877 A1 | 5/2004 | Lee et al. | |
| 2005/0105459 A1 | 5/2005 | Tamura et al. | |
| 2007/0019533 A1 | 1/2007 | Ogawa et al. | |
| 2007/0280094 A1 | 12/2007 | Takazawa et al. | |
| 2008/0151731 A1 | 6/2008 | Itoh et al. | |
| 2012/0307613 A1 | 12/2012 | Nishimura et al. | |

FOREIGN PATENT DOCUMENTS

| | | |
|---|---|---|
| JP | 2011-187100 A | 9/2011 |
| JP | 2011-243278 A | 12/2011 |
| KR | 10-2007-0012258 A | 1/2007 |
| KR | 10-2010-0112834 A | 10/2010 |
| KR | 10-2012-0085984 A | 8/2012 |
| WO | 2007/049605 A1 | 5/2007 |

OTHER PUBLICATIONS

Written Opinion dated Mar. 20, 2014, issued by the International Searching Authority in counterpart International Application No. PCT/KR2013/010052.
ECMA International., "Standard ECMA-364—1$^{st}$ Edition/Jun. 2005: Data Interchange on 120 mm and 80 mm Optical Disk using +R DL Format—Capacity: 8,55 and 2,66 GBytes per side (Recording speed 2,4×)", Jun. 2005, (158 Pages Total), XP002586008.
Communication dated Jun. 9, 2016, issued by the European Patent Office in counterpart European Application No. 13852811.2.
Communication dated Sep. 5, 2016, issued by the State Intellectual Property Office of P.R. China in counterpart Chinese application No. 201380058264.6.

* cited by examiner

OPTICAL DISK AND OPTICAL DISK REPRODUCTION DEVICE FOR REPRODUCING SAME

CROSS REFERENCE TO RELATED APPLICATIONS

This application is a National Stage of International Application No. PCT/KR2013/010052, filed on Nov. 7, 2013, which claims the priority of U.S. Provisional Application No. 61/723,497, filed Nov. 7, 2012 in the United States Patent Office, U.S. Provisional Application No. 61/815,408, filed on Apr. 24, 2013 in the United States Patent Office, and Korean Patent Application No. 10-2013-0133995, filed on Nov. 6, 2013 in the Korean Patent Office, the disclosures of all of which are incorporated herein by reference in their entireties.

BACKGROUND

Field

Apparatuses and methods consistent with exemplary embodiments relate to an optical disc and an optical disc reproduction apparatus for reproducing the same, and more particularly, to an optical disc which stores various information to be efficiently reproduced, and an optical disc reproduction apparatus for reproducing the same.

Description of Related Art

Generally, an optical disc reproduction apparatus reproduces data recorded on a disc such as compact disc (CD), compact disc-read only memory (CD-ROM), digital versatile disc (DVD), blu-ray disc (BD), CD-R, CD-RW, DVD±RW, or DVD-R.

The trend is moving forward to higher definition image content, and optical discs need to be able to store high-capacity data in order to store high-definition images. One way to store high-capacity data on an optical disc is to record data on only one layer; however, recent optical discs have a plurality of layers, each generated to record data thereon.

For an optical disc having a plurality of layers, more delicate and accurate techniques are necessary for inter-layer transition and for control or automatic adjustment of the respective layers. Particularly, optical discs having a high density of layers exhibit great differences in the servo signals on the respective layers at a stationery collimator lens (CL). Related technologies suffer the following shortcomings because they use an average value of several optical discs, and do not have specific information on the respective layers.

First, during a pull-in operation, the lack of information on the respective layers causes a deterioration of the stability of the servo signals detected by the optical disc reproduction apparatus when the position of the CL is misaligned, and in some cases, the focus-on operation sometimes fails when the size of a focus error signal (or focus drive signal) is too big or too small.

Further, during inter-layer transition, inter-layer transitions by way of layer jump are difficult in the beginning, even during stable operation on the current layer, due to a lack of information about the next layer. In the worst case, the inter-layer jump is ON on a layer different from n intended layer, or the layer jump itself fails.

Further, even when the focus is ON on the intended layer, the position of the CL or gain value by the amount of reflection may not be correct, in which case the initial value for automatic adjustment is deviated from the actual optimum value, requiring more steps for the transition in the automatic adjustment. As a result, servo drop occurs, or time is delayed during automatic adjustment. An optical disc which is considerably different from an initial value for the automatic adjustment can even cause a disc misjudgment.

Additionally, related art optical discs do not provide information about data transfer rate, or even if they do have information about data transfer rate, such information is limited to the overall basic transfer rate. Accordingly, an optical disc reproduction apparatus drives a driver at a spindle speed which corresponds to maximum velocity. If the apparatus fails to drive the driver at the spindle speed which is the maximum velocity supported, the transfer rate of the data read by the optical disc reproduction apparatus at a certain time point of increasing the transfer rate does not achieve the transfer rate as required by the optical disc. When this phenomenon continues for a predetermined time, a buffer underrun occurs. As a result, a data gap occurs for a predetermined time, which causes problems such as the image or sound being stopped.

In order to deal with the problems mentioned above, related art solutions set the spindle speed to the maximum velocity. This means that the data transfer rate is faster than the transfer rate required by the optical disc, and accordingly, a phenomenon such as buffer underrun does not occur. However, as the driver has to be kept driving at the high-velocity spindle speed, noise and vibration are generated. Additionally, current consumption also greatly increases.

SUMMARY

Accordingly, an object of one or more of the exemplary embodiments may be to provide an optical disc which stores information about amount of reflection and a thickness of each of a plurality of layers, and transfer rate information about each of a plurality of zones constituting a data zone, in order to drive the optical disc efficiently, and an optical disc reproduction apparatus for reproducing the same.

According to an aspect of an exemplary embodiment, an optical disc is provided including a plurality of layers, which may include an information storage zone which stores information about the optical disc, and a data zone which stores data. The information storage zone may store reflection amount information and thickness information of each of the plurality of layers.

The optical disc may be a blu-ray disc, and the information storage zone may be a permanent information control data (PIC) area included within a lead-in area of the optical disc.

Further, the reflection amount and the thickness information of each of the plurality of layers may be stored in a reserved area of the PIC area.

The reflection amount and the thickness information of each of the plurality of layers may be expressed as a value in the reserved area.

The reflection amount and the thickness information of each of the plurality of layers may be expressed as one of a plurality of preset sections in the reserved area.

According to an aspect of an exemplary embodiment, an optical disc reproduction apparatus is provided, which may include an optical pickup configured to emit light onto an information storage zone and to detect light reflected from the information storage zone, when an optical disc is mounted, the optical disc including the information storage zone storing therein reflection amount and thickness information of each of a plurality of layers, a signal processor configured to process the reflected light reflected from the information storage zone, and a controller configured to acquire the reflection amount and the thickness information of each of the plurality of layers of the optical disc based on a result of processing of the reflected light and to control reproduction of the optical disc.

The optical pickup may additionally include a collimator lens, and the optical disc reproduction apparatus may additionally include an amplifier configured to amplifying the reflected light received from the optical pickup. The controller may control the position of the collimator lens based on the reflection amount and the thickness information, and control a gain of the amplifier to perform a focus-on operation that suits one of the plurality of layers.

The controller may perform one of an automatic adjustment and a layer jump based on the reflection amount and the thickness information.

According to an aspect of another exemplary embodiment, an optical disc including one or more layers is provided, which may include an information storage zone storing information about the optical disc, and a data zone divided into a plurality of areas and storing data. The information storage zone may store transfer rate information of each of the plurality of areas.

The optical disc may be a blu-ray disc, and the information storage zone may be a permanent information control data (PIC) area included within a lead-in area of the optical disc.

Further, the transfer rate information of each of the plurality of areas may be stored in a reserved area of the PIC area.

Position information of a specific area and the transfer rate information of the specific area may be recorded in the reserved area sequentially.

Position information of the plurality of areas may be recorded in the reserved area and then the transfer rate information of each of the plurality of areas may be recorded.

The position information may be expressed as address information or radius information.

According to an aspect of another exemplary embodiment, an optical disc reproduction apparatus is provided, which may include an optical pickup configured to emit light onto an information storage zone and to detect light reflected from the information storage zone, when an optical disc is mounted, the optical disc including the information storage zone storing therein transfer rate information of each of a plurality of areas constituting a data zone, a signal processor configured to process the reflected light reflected from the information storage zone, a driver configured to drive the optical disc, and a controller configured to acquire a transfer rate of each of the plurality of areas of the optical disc based on a result of processing of the reflected light and to control a spindle speed of the driver.

The controller may acquire the position information of the currently-reproduced area during reproduction of the optical disc, compare the transfer rate corresponding to the currently-reproduced area with the spindle speed of the driver, and when the transfer rate corresponding to the currently-reproduced area is different from the spindle speed of the driver, the controller may control the driver to change the spindle speed of the driver to match the transfer rate corresponding to the currently-reproduced area.

Further, when the address of the reproduced area is changed, the controller may compare the transfer rate of the area corresponding to the changed address with the spindle speed of the driver, and when the transfer rate of the area corresponding to the changed address is different from the spindle speed of the driver, the controller may control the driver to change the spindle speed of the driver to match the transfer rate of the area that corresponds to the changed address.

According to an optical disc reproduction method according to one or more of the exemplary embodiments explained above, the optical disc reproduction apparatus may be capable of stably detecting a servo signal during focus pull-in operation, performing automatic adjustment within a shorter time, and performing a stable layer jump.

Further, an optical disc reproduction apparatus according to one or more of the exemplary embodiments described above may be capable of preventing buffer underrun which is generated when the transfer rate requirement is not met, and also removing noise and vibration that may occur due to excessive spindle speed.

BRIEF DESCRIPTION OF THE DRAWINGS

The above and/or other exemplary aspects and advantages will become apparent and more readily appreciated from the following detailed description, taken in conjunction with the accompanying drawings in which.

DETAILED DESCRIPTION OF EXEMPLARY EMBODIMENTS

Figure 1:
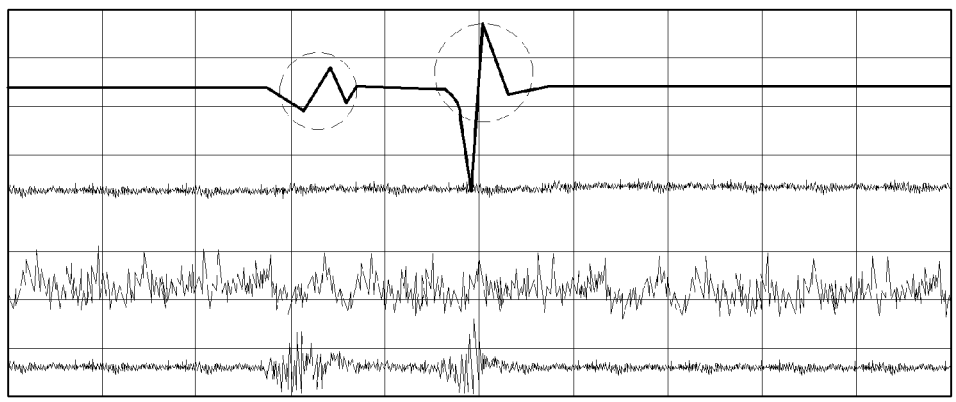
FIG. 1 is a diagram illustrating a focus error signal of a plurality of layers of a related art optical disc.
Figure 2:
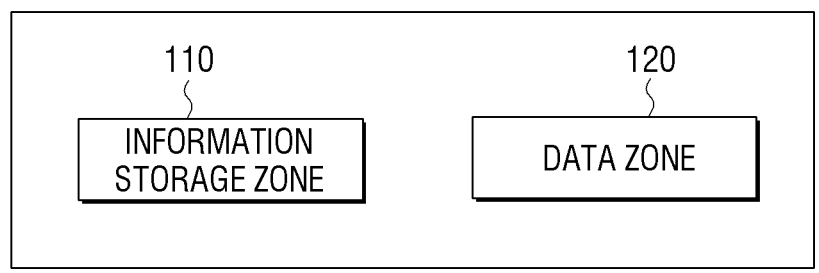
FIG. 2 is a block diagram of an optical disc according to an exemplary embodiment.

Exemplary embodiments will be explained in greater detail below with reference to the drawings. FIG. 2 is a block diagram of an optical disc 100 according to an exemplary embodiment. Referring to FIG. 2, the optical disc 100 includes an information storage zone 110 and a data zone 120. The optical disc 100 according to an embodiment may be a blu-ray disc (BD) having one or more layers, but is not limited thereto. Accordingly, the optical disc 100 may be any of a variety of optical discs such as a compact disc (CD), a digital versatile disc (DVD), a blu-ray ROM (BD-ROM) disc, etc.

The information storage zone 110 stores information about the optical disc 100. More specifically, the optical disc 100 may store information to enable an optical disc reproduction apparatus 200 to efficiently reproduce the optical disc.

For example, the information storage zone 110 may store information about amounts of reflection and thicknesses of each of a plurality of layers of the optical disc 100. More specifically, when the optical disc 100 is a blu-ray disc, the information storage zone 110 may be a permanent information control data (PIC) area which is included in a lead-in zone of the disc. The information about amounts of reflection and thicknesses of the respective layers may be stored in a reserved area of the PIC area. The information about the amounts of reflection and thicknesses of the plurality of layers may be expressed as specific values or as one or more preset sections in the reserved area.

Alternately, for example, the information storage zone 100 may store information about transfer rates of each of the plurality of areas that constitute the data zone. Specifically, if the optical disc 100 is a blu-ray disc, the information storage zone 110 may be the permanent information control data (PIC) area included in the lead-in zone of the disc. The information about transfer rates of the respective layers constituting the data zone may be stored in the reserved area of the PIC area. The position information of a specific area and transfer rate information of a specific area may be stored sequentially in the reserved area, and the transfer rate information of the plurality of areas may be recorded after all the position information of the plurality of areas is recorded in the reserved area. The position information may be expressed as address information or radius information of each of the plurality of zones.

The data zone 120 refers to a physical area that records data on the layer surfaces of the optical disc, and may refer to an any area other than the information storage zone explained above.

As explained above, the information storage zone 110 may store the information about amounts of reflection and thicknesses of the layers, and information about the transfer rates of each of the plurality of areas that constitute the data zone so that the optical disc reproduction apparatus 200 can reproduce the optical disc having a plurality of layers with increased efficiency.

Hereinbelow, an exemplary embodiment of storing various information on a blu-ray disc, in order to enable the blu-ray disc to be reproduced efficiently, will be explained with reference to FIG. 3.

Figure 3:
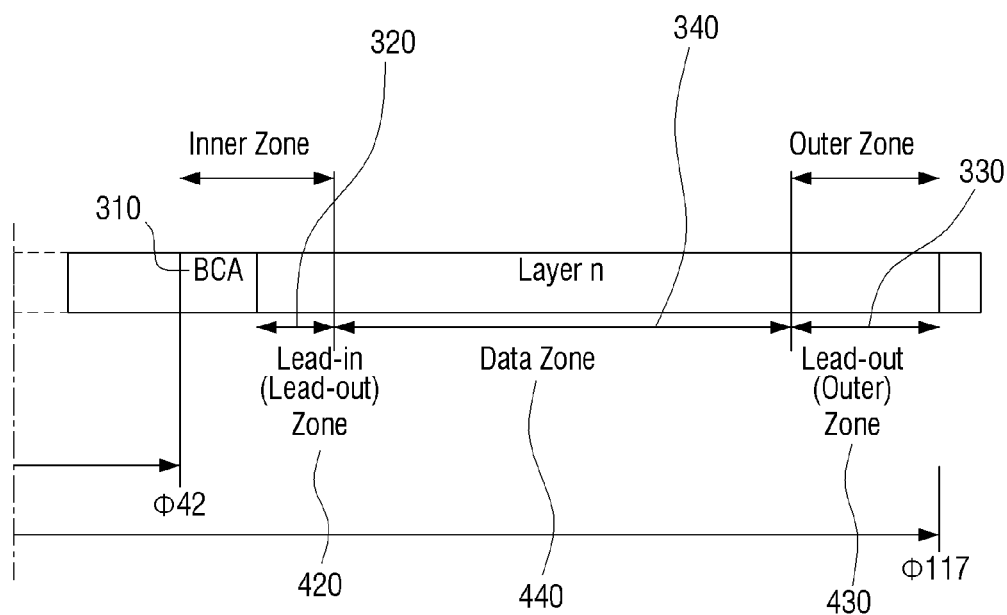
FIG. 3 is a diagram illustrating zones of a blu-ray disc according to an exemplary embodiment.

As illustrated in FIG. 3, the blu-ray disc includes an inner zone, a data zone 340, and an outer zone.

The inner zone may include a burst cutting area (BCA) 310 on which information such as copyright data media ID, etc. is recorded, and a lead-in zone 320. According to the blu-ray ROM format standard, the BCA is radially located between about 21.0 mm-22.2 mm on the blu-ray disc. The lead-in zone 42 includes a permanent information control data (PIC) area on which information about the optical disc is recorded. According to the blu-ray ROM format standard, the PIC area may be radially located between about 22.5-23.2 mm on the blu-ray disc.

Specifically, the related PIC area stores information about the blu-ray disc, as listed in Table 1 below.

TABLE 1

| Byte position in Data Frame 0 | Content | Number of Bytes |
|---|---|---|
| 0 | Disc Information identifier = "DI" | 2 |
| 2 | DI Format number | 1 |
| 3 | Number of DI units in each DI Block (5 bits) Number of the layer to which this DI unit applies (3 bits) | 1 |
| 4 | Reserved = 00h | 1 |
| 5 | DI unit sequence number in DI block (=0) | 1 |
| 6 | Continuation flag (1 bit) Number of DI bytes in use in this DI Unit (7 bits) | 1 |
| 7 | Reserved = 00h | 1 |
| 8 to 10 | BD Layer Type identifier/Channel bit Length | 1 |

TABLE 1-continued

| Byte position in Data Frame 0 | Content | Number of Bytes |
|---|---|---|
| 11 | Disc size/Class/Version | 1 |
| 12 | BD structure | 1 |
| 13 | Hybrid Disc identifier/Channel bit Length | 1 |
| 14 | Push-Pull polarity flag bits | 1 |
| 15 | Reserved = 00h | 1 |
| 16 | BCA descriptor | 1 |
| 17 | maximum transfer rate of application | 1 |
| 18 to 19 | Reserved = 00h | 1 |
| 20 to 23 | Last User Data Address | 4 |
| 24 to 31 | Data Zone allocation | 8 |
| 32 to 60 | Reserved = 00h | 29 |
| 61 and 62 | Time Stamp | 2 |
| 63 | Reserved = 00h | 1 |

According to an exemplary embodiment, in order to store reflection amount and thickness information of each of the plurality of layers, the blu-ray disc may store reflection amount information of the plurality of layers in the reserved areas 32 to 46 of the PIC data, and store thickness information of the plurality of layers in the reserved areas 47 to 60, as shown in Table 2 below. The reflection amount and thickness information may be expressed as specific values.

TABLE 2

| Byte position in Data Frame 0 | Content | Number of Bytes |
|---|---|---|
| 0 | Disc Information identifier = "DI" | 2 |
| 2 | DI Format number | 1 |
| 3 | Number of DI units in each DI Block (5 bits) Number of the layer to which this DI unit applies (3 bits) | 1 |
| 4 | Reserved = 00h | 1 |
| 5 | DI unit sequence number in DI block (=0) | 1 |
| 6 | Continuation flag (1 bit) Number of DI bytes in use in this DI Unit (7 bits) | 1 |
| 7 | Reserved = 00h | 1 |
| 8 to 10 | BD Layer Type identifier/Channel bit Length | 1 |
| 11 | Disc size/Class/Version | 1 |
| 12 | BD structure | 1 |
| 13 | Hybrid Disc identifier/Channel bit Length | 1 |
| 14 | Push-Pull polarity flag bits | 1 |
| 15 | Reserved = 00h | 1 |
| 16 | BCA descriptor | 1 |
| 17 | maximum transfer rate of application | 1 |
| 18 to 19 | Reserved = 00h | 1 |
| 20 to 23 | Last User Data Address | 4 |
| 24 to 31 | Data Zone allocation | 8 |
| 32 to 46 | Layer Reflection | 15 |
| 47 and 60 | Layer Thickness | 14 |
| 61 and 62 | Time Stamp | 2 |
| 63 | Reserved = 00h | 1 |

According to another example of storing the reflection amount and thickness information of each of the plurality of layers, the blu-ray disc may store the reflection amount information of the plurality of layers and the thickness information of the plurality of layers sequentially in the reserved areas 32 to 60 of the PIC data, as shown in Table 3 below. The reflection amount and thickness information may be expressed as one of a number of preset sections.

TABLE 3

| Byte position in Data Frame 0 | Content | Number of Bytes |
|---|---|---|
| 0 | Disc Information identifier = "DI" | 2 |
| 2 | DI Format number | 1 |
| 3 | Number of DI units in each DI Block (5 bits) Number of the layer to which this DI unit applies (3 bits) | 1 |
| 4 | Reserved = 00h | 1 |
| 5 | DI unit sequence number in DI block (=0) | 1 |
| 6 | Continuation flag (1 bit) Number of DI bytes in use in this DI Unit (7 bits) | 1 |
| 7 | Reserved = 00h | 1 |
| 8 to 10 | BD Layer Type identifier/Channel bit Length | 1 |
| 11 | Disc size/Class/Version | 1 |
| 12 | BD structure | 1 |
| 13 | Hybrid Disc identifier/Channel bit Length | 1 |
| 14 | Push-Pull polarity flag bits | 1 |
| 15 | Reserved = 00h | 1 |
| 16 | BCA descriptor | 1 |
| 17 | maximum transfer rate of application | 1 |
| 18 to 19 | Reserved = 00h | 1 |
| 20 to 23 | Last User Data Address | 4 |
| 24 to 31 | Data Zone allocation | 8 |
| 32 | Layer 0 Reflection | 1 |
| 33 | Layer 1 Reflection | 1 |
| 34 | Layer 2 Reflection | 1 |
| ... | ... | |
| 47 | Layer 0 Thickness | 1 |
| 48 | Layer 1 Thickness | 1 |
| 49 | Layer 2 Thickness | 1 |
| ... | ... | |
| 61 and 62 | Time Stamp | 2 |
| 63 | Reserved = 00h | 1 |

According to another exemplary embodiment, in order to store transfer rate information of each of the plurality of layers constituting the data zone, the blu-ray disc may store position information and transfer rate information of the plurality of layers sequentially in the reserved areas 32 to 60 of the PIC data.

TABLE 4

| Byte position in Data Frame 0 | Content | Number of Bytes |
|---|---|---|
| 0 | Disc Information identifier = "DI" | 2 |
| 2 | DI Format number | 1 |
| 3 | Number of DI units in each DI Block (5 bits) Number of the layer to which this DI unit applies (3 bits) | 1 |
| 4 | Reserved = 00h | 1 |
| 5 | DI unit sequence number in DI block (=0) | 1 |
| 6 | Continuation flag (1 bit) Number of DI bytes in use in this DI Unit (7 bits) | 1 |
| 7 | Reserved = 00h | 1 |
| 8 to 10 | BD Layer Type identifier/Channel bit Length | 1 |
| 11 | Disc size/Class/Version | 1 |
| 12 | BD structure | 1 |
| 13 | Hybrid Disc identifier/Channel bit Length | 1 |
| 14 | Push-Pull polarity flag bits | 1 |
| 15 | Reserved = 00h | 1 |
| 16 | BCA descriptor | 1 |
| 17 | maximum transfer rate of application | 1 |
| 18 to 19 | Reserved = 00h | 1 |
| 20 to 23 | Last User Data Address | 4 |
| 24 to 31 | Data Zone allocation | 8 |
| 32 | Zone 0 Position | 1 |
| 33 | Zone 0 Transfer Rate | 1 |
| 34 | Zone 1 Position | 1 |
| 35 | Zone 1 Transfer Rate | 1 |
| ... | | |
| 61 and 62 | Time Stamp | 2 |
| 63 | Reserved = 00h | 1 |

According to another exemplary embodiment, as another method for storing transfer rate information of each of the plurality of layers constituting the data zone, the blu-ray disc may first store position information of the plurality of areas in the reserved areas 32 to 39 of the PIC data, and then store transfer rate information of the plurality of areas in the areas 40 to 60, as shown in Table 5 below.

TABLE 5

| Byte position in Data Frame 0 | Content | Number of Bytes |
|---|---|---|
| 0 | Disc Information identifier = "DI" | 2 |
| 2 | DI Format number | 1 |
| 3 | Number of DI units in each DI Block (5 bits) Number of the layer to which this DI unit applies (3 bits) | 1 |
| 4 | Reserved = 00h | 1 |
| 5 | DI unit sequence number in DI block (=0) | 1 |
| 6 | Continuation flag (1 bit) Number of DI bytes in use in this DI Unit (7 bits) | 1 |
| 7 | Reserved = 00h | 1 |
| 8 to 10 | BD Layer Type identifier/Channel bit Length | 1 |
| 11 | Disc size/Class/Version | 1 |
| 12 | BD structure | 1 |
| 13 | Hybrid Disc identifier/Channel bit Length | 1 |
| 14 | Push-Pull polarity flag bits | 1 |
| 15 | Reserved = 00h | 1 |
| 16 | BCA descriptor | 1 |
| 17 | maximum transfer rate of application | 1 |
| 18 to 19 | Reserved = 00h | 1 |
| 20 to 23 | Last User Data Address | 4 |
| 24 to 31 | Data Zone allocation | 8 |
| 32 to 39 | Position Information (Transfer Rate) | 1 |
| 33 | Zone 0 Transfer Rate | 1 |
| 34 | Zone 1 Transfer Rate | 1 |
| 35 | Zone 2 Transfer Rate | 1 |
| ... | | |
| 61 and 62 | Time Stamp | 2 |
| 63 | Reserved = 00h | 1 |

As explained above with reference to Tables 2 through 5, the blu-ray disc may store reflection amount information and thickness information of a plurality of layers, and transfer rate information of a plurality of areas of the data zone, in the information storage zone (i.e., the PIC area).

The outer zone includes a lead-out zone 430, and the data zone 440 exists between the lead-in zone 420 and the lead-out zone 430.

In conjunction with the blu-ray disc explained above, the optical disc reproduction apparatus 200 is able to reproduce a blu-ray disc more efficiently, using the reflection amount information and thickness information of the plurality of layers stored in the PIC area of the blu-ray disc, and the transfer rate information of the plurality of areas of the data zone.

Hereinbelow, an optical disc reproduction apparatus 200 according to an embodiment will be explained with reference to FIGS. 4 to 6.

Figure 4:
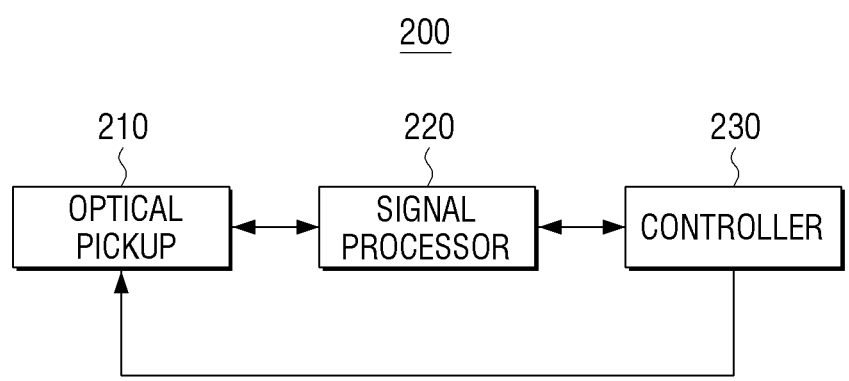
FIG. 4 is a schematic block diagram of an optical disc reproduction apparatus according to an exemplary embodiment.

FIG. 4 is a schematic block diagram of the optical disc reproduction apparatus 200 according to an exemplary embodiment. Referring to FIG. 4, the optical disc reproduction apparatus 200 includes an optical pickup 210, a signal processor 220 and a controller 230. The optical disc reproduction apparatus 200 may be a BD player, but not limited thereto. Accordingly, the optical disc reproduction apparatus 200 may be any of a variety of optical disc reproduction apparatuses 200 such as a CD player, a DVD player, etc.

The optical pickup 210 reads data recorded on the optical disc. That is, the optical pickup 210 reads the data recorded on the optical disc by emitting light onto the surface of the optical disc and detecting the light reflected from the surface of the optical disc. Additionally, the optical pickup 210 may perform the function of recording data on the optical disc 100. The optical pickup 210 may include a collimator lens through which light is emitted onto the surface of the optical disc.

According to an exemplary embodiment, when an optical disc 100 is mounted, the optical disc 100 including the information storage zone storing therein reflection amount information and thickness information of each of the plurality of layers, the optical pickup 210 may emit light onto the information storage zone of the optical disc 100 and detect the reflected light from the information storage zone.

According to another exemplary embodiment, when the optical disc 100 is mounted, the optical disc 100 including the information storage zone that stores transfer rate information of each of the plurality of areas constituting the data zone, the optical pickup 210 may emit light onto the information storage zone and detect the reflected light from the information storage zone.

The signal processor 220 may acquire a radio frequency (RF) signal or a servo control signal by signal-processing the detected reflected light. Specifically, the signal processor 220 generates a servo control signal to perform mechanical servo control to thus pickup the RF signal accurately from the data zone 120 of the optical disc.

The controller 230 controls the overall operation of the optical disc reproduction apparatus 200.

According to an exemplary embodiment, when the optical disc is mounted, the optical disc including the information storage zone storing therein reflection amount information and thickness information of each of the plurality of layers, the controller 230 may acquire the reflection amount information and thickness information of each of the plurality of layers of the optical disc based on the result of processing of the reflected light carried out at the signal processor 220.

That is, the controller may perform a focus-on operation that suits one of a plurality of layers, by adjusting a position of the collimator lens of the optical pickup 210 or by controlling a gain value of the servo control signal based on the acquired reflection amount information and thickness information.

Further, the controller 230 may perform automatic adjustment of the gain values and the position of the collimator lens which are calculated based on the acquired reflection amount information and thickness information. Specifically, because there is no substantial difference between the optimum point for the automatic adjustment and a reference point that is calculated based on the acquired reflection amount information and thickness information, even a short distance of movement may be enough to perform an automatic adjustment. Therefore, adjustment time can be shortened. That is, in the related art in which information about characteristics of the layers of the optical disc are not known, the automatic adjustment is performed based on the same reference point for all the optical discs. Accordingly, when the reference point is deviated to a certain side, the automatic adjustment would have monotone decrease/ monotone increase in the curve fitting result. As a result, the time for the automatic adjustment increases or the automatic adjustment fails according to the related art. According to one or more exemplary embodiments described herein, the reference point for the automatic adjustment is calculated based on the reflection amount information and thickness information of the layers. Accordingly, the difference between the optimum point and the reference point is decreased, thus allowing acquisition of accurate curve fitting result with a small movement, which can lead into stable automatic adjustment.

Further, the controller 130 may perform a layer jump based on the reflection amount information and thickness information. That is, in response to a user command for a layer jump or to perform a layer jump during a lead-in operation, the controller 130 may adjust the position of the collimator lens based on the reflection amount information and thickness information and adjust the gain value of the servo control signal, to ensure that a stable layer jump is performed. Accordingly, the time required for the layer jump is shortened, and the possibility that the layer jump may fail, decreases.

Specifically, according to an exemplary embodiment, when the optical disc is mounted, the optical disc including the information storage zone storing therein reflection amount information and thickness information of each of the plurality of layers, the controller 230 may acquire the reflection amount information and thickness information of each of the plurality of layers of the optical disc based on the result of processing the reflected light carried out at the signal processor 220 and control the reproduction of the optical disc.

Meanwhile, according to an exemplary embodiment, when the optical disc is mounted, the optical disc including the information storage zone that stores transfer rate information of each of the plurality of areas constituting the data zone, the controller 230 may acquire the transfer rate information of each of the plurality of areas of the optical disc based on the result of processing of the reflected light carried out at the signal processor 220 and control the spindle speed of the driver.

That is, the controller 230 acquires the position information of the currently-reproduced area based on the result of processing the reflected light, and compares the transfer rate corresponding to the currently-reproduced area with the spindle speed of the driver. When the transfer rate corresponding to the currently-reproduced area is same as the spindle speed of the driver, the controller 230 maintains the spindle speed of the driver. However, when the transfer rate corresponding to the currently-reproduced area is different from the spindle speed of the driver, the controller 230 may change the spindle speed of the driver to match the transfer rate corresponding to the currently-reproduced area.

Further, when the address of the reproduced area is changed during optical disc reproduction, the controller 230 compares the transfer rate of the area corresponding to the changed address with the spindle speed of the driver. When the transfer rate of the area corresponding to the changed address is same as the spindle speed of the driver, the controller 230 maintains the spindle speed of the driver. However, when the transfer rate of the area corresponding to the changed address is different from the spindle speed of the driver, the controller 230 may change the spindle speed of the driver to match the transfer rate of the area that corresponds to the changed address.

As explained above, by checking the transfer rate information of the plurality of areas, the optical disc reproduction apparatus 200 is able to reproduce the optical disc at an optimum spindle speed. As a result, the stopping of images, and noise and vibration can be eliminated.

Figure 5:
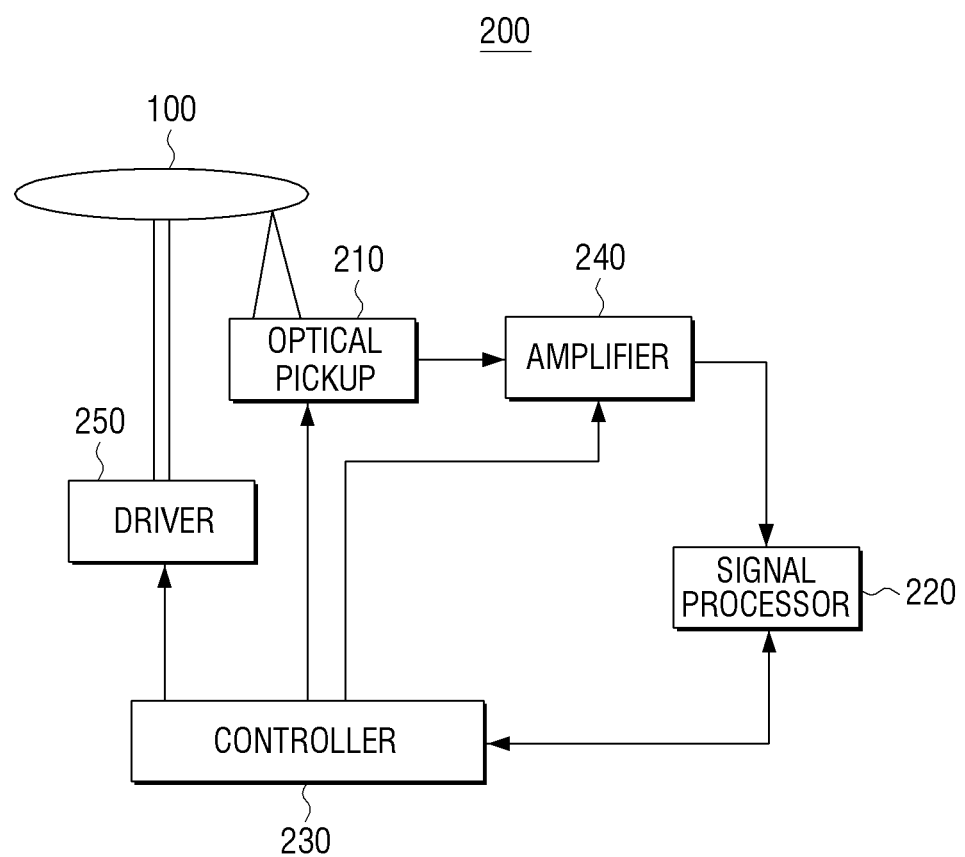
FIG. 5 is a detailed block diagram of an optical disc reproduction apparatus according to an exemplary embodiment.

FIG. 5 is a detailed block diagram of the optical disc reproduction apparatus 200 according to an exemplary embodiment. Referring to FIG. 5, the optical disc reproduction apparatus 200 includes an optical pickup 210, an amplifier 240, a signal processor 220, a driver 250 and a controller 230.

The optical pickup 210, under control of the controller 230, emits light onto the optical disc 100 and detects reflected light. Specifically, the optical pickup 210 is driven by a tracking actuator for tracking servo control and a focusing actuator for focus servo control, and is configured to optically pickup the data recorded on the optical disc 100 and convert it into electric RF signals.

The optical pickup 210 includes a collimator lens through which light is emitted onto the optical disc 100 and may perform a focus-on operation and a layer jump by adjusting the position of the collimator lens.

The amplifier 210 amplifies a signal received from the optical pickup 210. Specifically, the amplifier 210 includes a built-in a focus error detection circuit and a tracking error detection circuit to generate a focus error signal and a tracking error signal from the amplified RF signal.

The signal processor 220 processes the amplified signal from the amplifier 210. Specifically, the signal processor 220 may offset gain and phase with regard to the focus error signal and the tracking error signal generated from the amplifier 210 and output a focus drive signal and a tracking drive signal.

The driver 250 drives a disc motor, or the focusing actuator and the tracking actuator in the optical pickup 110 according to control of the controller 230.

The controller 250 controls the overall operation of the optical disc reproduction apparatus 200. Specifically, when the optical disc storing the reproduction information about the optical disc is mounted, the controller 230 may control the reproduction of the optical disc based on the reproduction information about the optical disc.

According to an exemplary embodiment, when the optical disc is mounted, the optical disc including the information storage zone storing therein reflection amount information and thickness information of each of the plurality of layers, the controller 230 may acquire the reflection amount information and thickness information of each of the plurality of layers of the optical disc using the optical pickup 210 and the signal processor 220. The controller 230 may then adjust the gain value of the amplifier 240, or adjust the position of the collimator lens of the optical pickup 210 based on the acquired reflection amount information and thickness information, to perform focus-on operation of the optical disc, automatic adjustment and layer transition (or layer jump), etc., as explained above.

Figure 6:
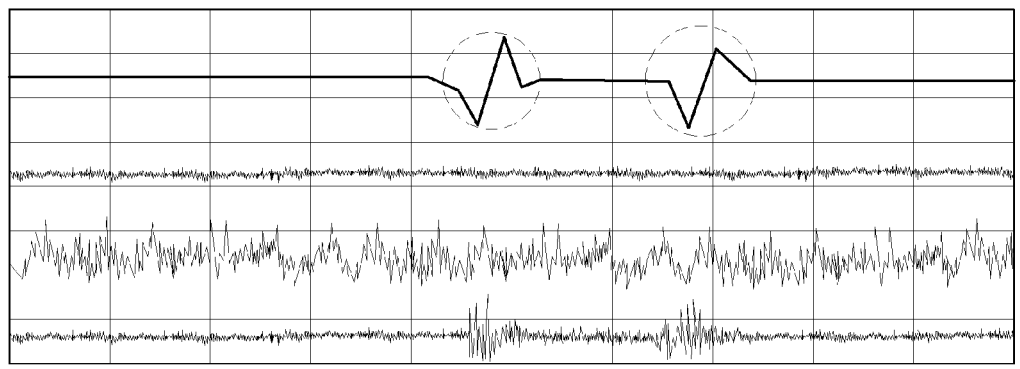
FIG. 6 is a diagram illustrating a focus error signal of a plurality of layers of an optical disc according to an exemplary embodiment.

Specifically, the controller 230 may detect a focus error signal having a suitable size for each of the layers, as illustrated in FIG. 6, by adjusting the gain value of the amplifier 240 or adjusting position of the collimator lens of the optical pickup 210 based on the based on the reflection amount information and thickness information of each of the plurality of layers.

The controller 230 may perform a focus-on, an automatic adjustment, or an inter-layer transition of the optical disc 100 based on the detected focus error signal, or the like.

According to another exemplary embodiment, when the optical disc is mounted, the optical disc including the information storage zone that stores transfer rate information of each of the plurality of areas constituting the data zone 120, the controller 230 may acquire the transfer rate information of each of the plurality of areas of the optical disc, using the optical pickup 210 and the signal processor 220. The controller 230 may then control the spindle speed of the driver 250 based on the acquired transfer rate information of each of the plurality of areas.

That is, the controller 230 checks the position information of a currently-reproduced area. The controller 230 then compares the transfer rate corresponding to the currently-reproduced area with the spindle speed of the driver 250. When the transfer rate corresponding to the currently-reproduced area is different from the spindle speed of the driver, the controller 230 may change the spindle speed of the driver to match the transfer rate corresponding to the currently-reproduced area.

Furthermore, when the address of the reproduced area is changed, the controller 230 may compare the transfer rate of the area corresponding to the changed address with the spindle speed of the driver 250. When the transfer rate of the area corresponding to the changed address is different from the spindle speed of the driver 250, the controller 230 may change the spindle speed of the driver 250 to match the transfer rate of the area that corresponds to the changed address.

Hereinbelow, an optical disc reproduction method of the optical disc reproduction apparatus 200 according to an exemplary embodiment will be explained with reference to FIGS. 7 and 8.

Figure 7:
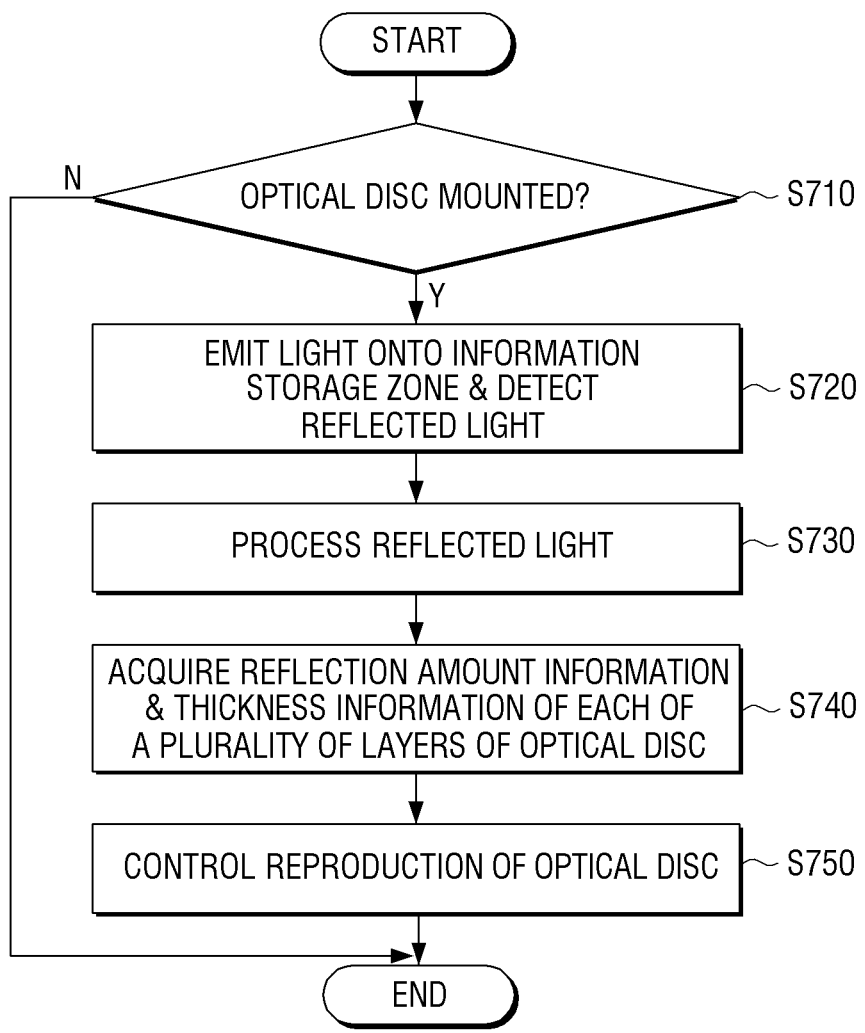
FIGS. 7 and 8 are flowcharts of an optical disc reproduction method according to an exemplary embodiment.

FIG. 7 is a flowchart provided to explain an optical disc reproduction method according to an exemplary embodiment, in an example in which an optical disc is mounted, the optical disc storing therein reflection amount information and thickness information of each of a plurality of layers.

At S710, the optical disc reproduction apparatus 200 determines whether or not the optical disc 100 is mounted. The information storage zone 110 of the optical disc 100 may store reflection amount information and thickness information of each of a plurality of layers.

At S710-Y, when the optical disc 100 is mounted, the optical disc reproduction apparatus 200 emits light onto the information storage zone and detects reflected light, at S720. The optical disc reproduction apparatus 200 processes the reflected light, at S730, and acquires reflection amount information and thickness information of each of a plurality of layers of the optical disc 100 from the processed reflected light, at S740.

The optical disc reproduction apparatus 200 controls the reproduction of the optical disc based on the acquired reflection amount information and thickness information, at S750. Specifically, based on the acquired reflection amount information and thickness information, the optical disc reproduction apparatus 200 may adjust the gain value of the amplifier 240, or adjust the position of the collimator lens of the optical pickup 210, to thus perform a focus-on operation, an automatic adjustment, a layer jump), etc.

With the optical disc reproduction method explained above, an exemplary optical disc reproduction apparatus is capable of stably detecting a servo signal during focus pull-in operation, performing an automatic adjustment within shorter time, and performing a stable layer jump.

Figure 8:
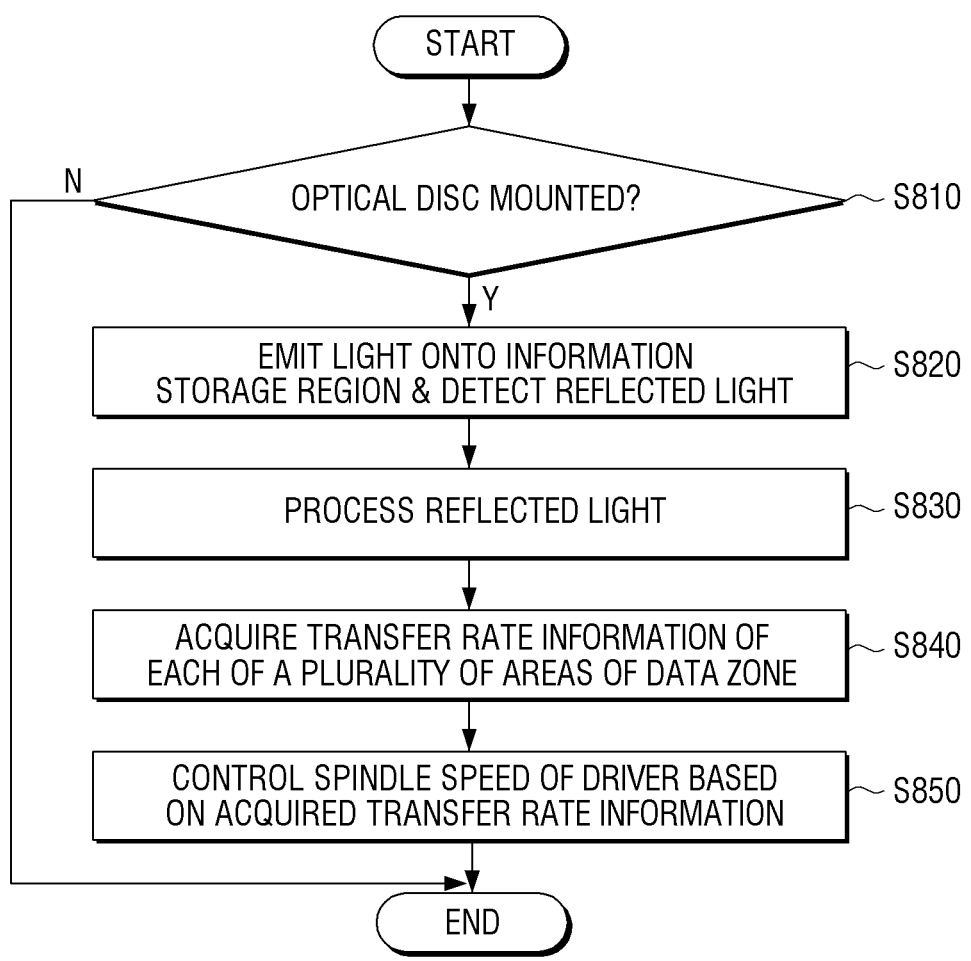

FIG. 8 is a flowchart provided to explain an optical disc reproduction method according to an exemplary embodiment, in an example in which the optical disc is mounted, the optical disc storing transfer rate information about each of a plurality of areas constituting the data zone.

The optical disc reproduction apparatus 200 determines whether or not the optical disc 100 is mounted, at S810. The information storage zone 110 of the optical disc 100 may store transfer rate information of each of a plurality of areas constituting the data zone.

At D810-Y, when the optical disc 100 is mounted, the optical disc reproduction apparatus 200 emits light onto the information storage zone and detects reflected light, at S820. The optical disc reproduction apparatus 200 processes the reflected light, at S830, and acquires transfer rate information of each of a plurality of areas constituting the data zone from the processed reflected light, at S840.

The optical disc reproduction apparatus 200 controls the spindle speed of the driver 250 based on the transfer rate information of each of the plurality of areas, at S850. Specifically, the optical disc reproduction apparatus 200 may acquire the position information of the currently-reproduced area based on the result of processing of the reflected light, and compare the transfer rate corresponding to the currently-reproduced area with the spindle speed of the driver 250. When the transfer rate corresponding to the currently-reproduced area is different from the spindle speed of the driver, the optical disc reproduction apparatus 200 may change the spindle speed of the driver to match the transfer rate corresponding to the currently-reproduced area.

According to the optical disc reproduction method as explained above, the optical disc reproduction apparatus 200 is capable of preventing buffer underrun which is generated when the transfer rate requirement is not met, and also removing noise and vibration that may occur due to excessive spindle speed.

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

The invention claimed is:

1. An optical disc comprising a plurality of layers, the optical disc comprising:
   an information storage zone which stores information about the optical disc; and
   a data zone which stores data, wherein the information storage zone stores reflection amount information of each of the plurality of layers and thickness information of each of the plurality of layers,
   wherein the reflection amount information of each of the plurality of layers and thickness information of each of the plurality of layers are used for controlling a position of a collimator lens of an optical disc reproduction apparatus, and controlling a gain of an amplifier of the optical disc reproduction apparatus.

2. The optical disc of claim 1, wherein the optical disc is a blu-ray disc, and the information storage zone is a permanent information control data (PIC) area within a lead-in area of the optical disc.

3. The optical disc of claim 2, wherein the reflection amount information of each of the plurality of layers and the thickness information of each of the plurality of layers is stored in a reserved area of the PIC area.

4. The optical disc of claim 3, wherein the reflection amount information of each of the plurality of layers and the thickness information of each of the plurality of layers is expressed as a value in the reserved area.

5. The optical disc of claim 3, wherein the reflection amount information of each of the plurality of layers and the thickness information of each of the plurality of layers is expressed as one of a plurality of preset sections in the reserved area.

6. An optical disc reproduction apparatus comprising:
   an optical pickup configured to emit light onto an information storage zone of an optical disc and to detect light reflected from the information storage zone of the optical disc, when the optical disc is mounted, wherein the information storage zone of the optical disc stores therein reflection amount information of each of a plurality of layers of the optical disc and thickness information of each of the plurality of layers;
   a signal processor configured to process the light reflected from the information storage zone;
   a controller configured to acquire the reflection amount information of each of the plurality of layers and the thickness information of each of the plurality of layers based on a result of processing the reflected light and to control a reproduction of the optical disc based on the reflection amount information of each of the plurality of layers and the thickness information of each of the plurality of layers; and
   an amplifier configured to amplify the light reflected from the information storage zone,
   wherein the optical pickup comprises a collimator lens, and
   the controller controls a position of the collimator lens based on the reflection amount information of each of the plurality of layers and the thickness information of each of the plurality of layers, and performs a focus-on operation by controlling a gain of the amplifier according to the reflection amount information of one of the plurality of layers and the thickness information of the one of the plurality of layers.

7. The optical disc reproduction apparatus of claim 6, wherein the controller performs one of an automatic adjustment and a layer jump based on the reflection amount information of each of the plurality of layers and the thickness information of each of the plurality of layers.

8. An optical disc comprising one or more layers, the optical disc comprising:
   an information storage zone which stores information about the optical disc; and
   a data zone which is divided into a plurality of areas and which stores data,
   wherein the information storage zone stores transfer rate information of each of the plurality of areas, and
   wherein the transfer rate information of each of the plurality of areas is used for comparing a transfer rate of an area corresponding to a reproduction address with a spindle speed of a driver of an optical disc reproduction apparatus, and controlling the driver to change the spindle speed of the driver to match the transfer rate of the area corresponding to the reproduction address.

9. The optical disc of claim 8, wherein the optical disc is a blu-ray disc, and the information storage zone is a permanent information control data (PIC) area included within a lead-in area of the optical disc.

10. The optical disc of claim 9, wherein the transfer rate information of each of the plurality of areas is stored in a reserved area of the PIC area.

11. The optical disc of claim 10, wherein position information of a specific area and the transfer rate information of the specific area are recorded in the reserved area sequentially.

12. The optical disc of claim 10, wherein position information of each of the plurality of areas is recorded in the reserved area and the transfer rate information of each of the plurality of areas is recorded in a portion of the reserved area not occupied by the position information of each of the plurality of areas.

13. The optical disc according to claim 11, wherein the position information is expressed as one of address information and radius information.

14. An optical disc reproduction apparatus comprising:
an optical pickup configured to emit light onto an information storage zone of an optical disc and to detect light reflected from the information storage zone, when the optical disc is mounted, wherein the information storage zone of the optical disc stores therein transfer rate information of each of a plurality of areas constituting a data zone of the optical disc;

a signal processor configured to process the light reflected from the information storage zone;

a driver configured to drive the optical disc; and a controller configured to acquire a transfer rate of each of the plurality of areas of the optical disc based on a result of processing the light reflected from the information storage zone and to control a spindle speed of the driver based on the transfer rate of each of the plurality of areas of the optical disc, wherein, when an address of a reproduced area is changed, the controller compares a transfer rate of an area corresponding to the changed address with the spindle speed of the driver, and when the transfer rate of the area corresponding to the changed address is different from the spindle speed of the driver, controls the driver to change the spindle speed of the driver to match the transfer rate of the area that corresponds to the changed address.

\* \* \* \* \*